(12) United States Patent
Freund et al.

(10) Patent No.: US 7,140,202 B2
(45) Date of Patent: Nov. 28, 2006

(54) METHOD FOR MANUFACTURING OPTICAL GLASSES AND COLORED GLASSES AT LOW TEMPERATURES

(75) Inventors: Jochen Freund, Mainz (DE); Monika Gierke, Wiesbaden-Erbenheim (DE); Uwe Kolberg, Mainz-Kastel (DE); Ruediger Hentschel, Bodenheim (DE); Rolf Clasen, Saarbrücken (DE)

(73) Assignee: Schott AG, Mainz (DE)

( * ) Notice: Subject to any disclaimer, the term of this patent is extended or adjusted under 35 U.S.C. 154(b) by 399 days.

(21) Appl. No.: 10/224,065

(22) Filed: Aug. 20, 2002

(65) Prior Publication Data

US 2003/0110799 A1    Jun. 19, 2003

(30) Foreign Application Priority Data

Aug. 22, 2001 (DE) ................. 101 41 103

(51) Int. Cl.
*C03B 19/06* (2006.01)

(52) U.S. Cl. .............. 65/17.2; 65/17.3; 65/17.5; 65/385; 65/440; 501/12

(58) Field of Classification Search ............. 65/17.2, 65/17.3, 17.5, 385, 440; 501/12
See application file for complete search history.

(56) References Cited

U.S. PATENT DOCUMENTS

| | | | | |
|---|---|---|---|---|
| 4,419,115 | A * | 12/1983 | Johnson et al. ............. | 65/395 |
| 4,432,956 | A | 2/1984 | Zarzycki et al. | |
| 4,680,045 | A * | 7/1987 | Osafune et al. ............. | 65/396 |
| 4,680,047 | A * | 7/1987 | Clasen et al. ............... | 65/17.2 |
| 4,695,305 | A | 9/1987 | Clasen ........................ | 65/18.3 |
| 4,707,174 | A * | 11/1987 | Johnson et al. ............. | 65/395 |
| 4,772,431 | A * | 9/1988 | Aubert ........................ | 588/12 |
| 4,851,150 | A | 7/1989 | Hench et al. ............. | 252/315.6 |
| 4,883,521 | A * | 11/1989 | Shimizu et al. .............. | 65/17.2 |
| 5,091,115 | A | 2/1992 | Nogami | |
| 5,093,286 | A * | 3/1992 | Nogami et al. ............... | 501/17 |
| 5,122,178 | A | 6/1992 | Omi et al. | |
| 5,240,488 | A * | 8/1993 | Chandross et al. .......... | 65/395 |
| 5,250,096 | A * | 10/1993 | Bruce et al. ................. | 65/390 |
| 5,698,205 | A * | 12/1997 | Bruckner et al. ........... | 424/401 |
| 6,245,698 | B1 * | 6/2001 | Pope et al. .................. | 501/12 |
| 2003/0153451 | A1 | 8/2003 | Clasen et al. ................ | 501/58 |

(Continued)

FOREIGN PATENT DOCUMENTS

DE        290 174        5/1991

(Continued)

OTHER PUBLICATIONS

Harper, Handbook of Materials for Product Design, McGraw-Hill, copyright 2001, p. 8.41.*

(Continued)

*Primary Examiner*—Sean Vincent
(74) *Attorney, Agent, or Firm*—Baker & Daniels

(57) ABSTRACT

The invention relates to a method for manufacturing optical glasses and colored glasses with the aid of a fluid phase sintering process from a basic material encompassing at least $SiO_2$ powder as well as additives for reducing the temperature of the fluid phase sintering and/or melting process encompassing the following steps: the starting materials are dissolved in any sequence in a fluid medium to produce a solution as far as is possible and a suspension to the extent that they are not dispersed in solution; a greenbody is produced from the dissolved and dispersed starting materials; the greenbody is dried the dried greenbody is fluid-phase sintered at temperatures below 1200° C., in particular in the temperature range from 600° C. to 1200° C.

19 Claims, 1 Drawing Sheet

U.S. PATENT DOCUMENTS

2003/0158029 A1    8/2003    Clasen et al. .................. 501/58

FOREIGN PATENT DOCUMENTS

| DE | 41 29 409 A1 | 3/1993 |
| EP | 0 196 140 A1 | 10/1986 |
| EP | 0 233 732 A2 | 8/1987 |
| EP | 1 285 889 | 2/2003 |
| EP | 1 285 890 | 2/2003 |
| JP | 60-16830 | 1/1985 |
| JP | 60-171228 | 9/1985 |
| JP | 62-100428 | 5/1987 |
| JP | 62-167233 | 7/1987 |
| JP | 2-221130 | 9/1990 |
| JP | 3-159924 | 7/1991 |
| JP | 03 295826 | 12/1991 |
| RU | 1669881 | 8/1991 |
| RU | 1671625 | 8/1991 |

OTHER PUBLICATIONS

Microsoft Bookshelf Basic, Copyright 1994, Thesaurus page for "break".*
Degussa, Aerosil & Silanes Brochure, printed Sep. 2001, p. 5.*
Holmberg, Handbook of Applied Surface and Colloid Chemistry, vol. 1-2, copyright 2002, John Wiley & Sons, pp. 203 & 212.*

* cited by examiner

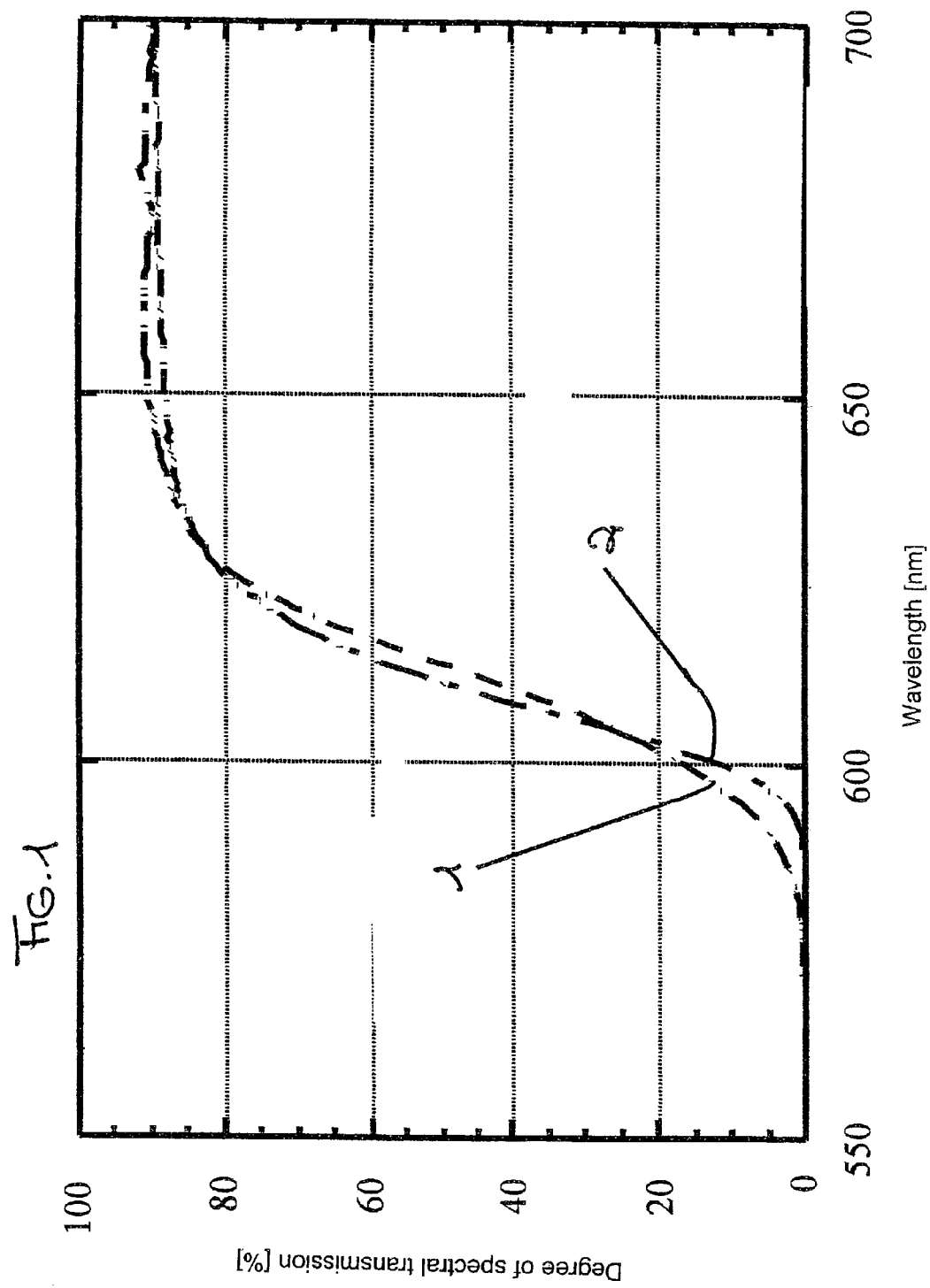

METHOD FOR MANUFACTURING OPTICAL GLASSES AND COLORED GLASSES AT LOW TEMPERATURES

The invention concerns a method for manufacturing optical glasses and/or coloured glasses using a sintering or melting process. A sintering process is defined as a process involving a viscosity of $\eta > 1 \times 10^8$ dPa s and a melting process is defined as a process involving a viscosity of $\eta < 1 \times 10^2$ dPa s. In particular cases this method can be used to manufacture multi-component glasses, particularly coloured glass which is tinted by means of MX semiconductor doping, with M being defined as either Cd alone or Cd+Zn and X being defined as S, Se or Te.

Essentially two methods for manufacturing glasses by means of a sintering process are known by those conversant with current state of the art technology:

the sol-gel process and a method employing powder technology.

One method that can be employed to produce glass by means of a sol-gel process is described in U.S. Pat. No. 4,432,956. However, this patent only describes the production of silica glass manufactured at temperatures of 1300–1500° C.

In order to include further components in glass synthesis one can avail oneself of methods such as those described in patents DE 4129409 A1, EP 0233732 A1 and U.S. Pat. No. 5,091,115. All these methods are based on silicon alkoxides such as tetraethyl orthosilicate (TEOS) and other soluble compounds that as a rule are processed using alcoholic solvents. A base material for $SiO_2$ can be, for example tetraethyl orthosilicate and the base materials for adding further glass components, such as $B_2O_3$, $Al_2O_3$, $Na_2O$ or $P_2O_5$, can be boric acid trimethyl ester, aluminium triisopropylate, sodium methylate, zinc-2,4-pentanedionat, tributyl phosphate, or other alkoxides. Some of these raw materials are toxic so the sol-gel method is disadvantageous in terms of environmental aspects due to the raw materials employed and to date have only been used for coated glasses. A further disadvantage of the sol-gel method is that the process is costly due to the expense of the raw materials, requires a considerable amount of time and cannot be employed for large components due to the high level of shrinkage in drying and cracking.

A manufacturing process by means of which a CdSSe-doped coloured glass can be produced using a sol-gel process is described in JP 02221130 A. However, this method employs the same silica alkoxide as its raw material as that described in U.S. Pat. No. 4,432,956, so that it has the same disadvantages as all sol-gel methods, particularly in terms of the environment.

Another method for producing glass using a sintering process is a method employing powder technology. The patent EP 0196140 B1 describes a method employing powder technology. The method disclosed in EP 0196140 B1 employs a nanoscale $SiO_2$ powder such as AREOSIL® OX-50 (DEGUSSA AG) as a base material. In comparison with the sol-gel method this method has the advantage in the preferred case that no alcoholic raw materials or solvents have to be used and water can be employed as the dispersion medium. This results in less environmental contamination, the prevention of unpleasant smelling vapours, the elimination of fire danger and more cost-effective production.

The production of glass in accordance with EP 0196140 B1 is based on the fact that a glass powder suspension is produced and that this suspension is further processed into a greenbody. The greenbody can be condensed to form transparent, dimensionally stable glass following drying. This has the advantage that the intermediate glass product can be produced at room temperature and retains its shape and form during firing.

However, EP 0196140 B1 only describes the production of silica glass that is sintered at temperatures between approximately 1300 and 1500° C. These temperatures are too high for employing MX as the doping material since a large proportion of the doping material is sublimated or oxidised at these temperatures. Another disadvantage is that the high temperatures make the process exceptionally energy consuming.

Further methods that employ nanoscale $SiO_2$ powder and other components in addition to $SiO_2$ are described in the patents JP 62167233 A, JP 60171228 A, JP 62100428 A and JP 03159924 A.

However, in accordance with JP 62167233 A, JP 60171228 A, JP 62100428 A and JP 03159924 A, the nanoscale SiO2 is only utilised as an additional component to the alkoxide silicates such as for instance TEOS. These raw materials and the use of alcoholic solvents also result in environmental contamination from the production of these glasses. Moreover, in order to manufacture glasses in accordance with JP 62167233 A, JP 60171228 A, JP 62100428 A and JP 03159924 A, temperatures have to be employed which are between 1200 and 2000° C.

U.S. Pat. No. 5,122,178 and JP 60016830 A disclose manufacturing processes for CdS, CdSe and CdTe doped glasses. The methods in both these patents are based, however, on the glass being melted. In U.S. Pat. No. 5,122,178, as in the normal manufacturing process for these glasses, the doping agent is added during the melting process. The sole differences with respect to the established manufacturing process are the modified processing temperatures and process stages. However, relatively high processing temperatures of 1300° C. are still required for melting the glass. The patent JP 60016830 A is based on a two-phase process. Initially a colourless base glass is melted and doped by adding powdered CdS after the grinding process and then finally sintered. The drawbacks to the process described in JP 60016830 A are the time-consuming and costly multi-stage processing and the fact that it is not possible to produce the shape of the final product at the greenbody production stage when using the manufacturing method pursuant to JP 60016830. This means that the shape of the end product is achieved in JP 60016830 A by means of sintering a powder blank. Shaping during the sintering process is particularly difficult, however, when bodies of a complex shape are to be manufactured.

It is therefore the aim of the invention to make known a production method for optical glasses that overcomes the disadvantages of current state-of-the-art technology and in particular, makes it possible to manufacture coloured glasses using MX doping substances. The method is environmentally friendly, cost-effective and energy-efficient and presents no fire hazard.

In accordance with the invention, this aim is fulfilled by a method in accordance with claim 1.

The inventors have recognised the fact that the method in accordance with the invention is conducted in a viscosity range that corresponds neither with that of the classic sintering process with its viscosity of $\eta > 1 \times 10^5$ dPa s nor with that of the classic melting process with its viscosity of $\eta < 1 \times 10^2$ dPa s, but in a viscosity range between these. Therefore, the process in accordance with the invention is termed fluid phase sintering or high viscosity melting. The advantage over the sintering process is that with the process in accordance with the invention, the grain boundary between the components and therefore also the concentration gradients are reduced not only by the diffusion process, but also by plastic flow processes. This results in the process in accordance with the invention being clearly more effective than the classic sintering process. In order to fully maintain the external shape, a ceramic aid is used for stabilisation purposes. In comparison with a pure melting process, it is the substantially lower temperature that constitutes the advantage.

In accordance with the method specified in the invention, a powdery SiO2 or $SiO_2$ suspension encompassing a greenbody and that can be sintered is produced by means of a method employing powder technology. Further additives are used in addition to the powdery $SiO_2$ to reduce the temperature of the sintering process in comparison with that found in current state-of-the-art processes and to match the properties of the glass to the doping agent, with no alcoholic solvents being required.

The raw material is $SiO_2$ powder with a primary particle size between 8 nm and 800 nm, preferably 20–100 nm or a $SiO_2$ suspension. The raw materials used as additives are boric acid, zinc oxide, potassium carbonate, potassium hydroxide solution and other compounds that have network-modifying properties. However, the additives can also be any other kind of carbonate, alkaline solutions and bases, such as for instance a caustic soda solution or potassium hydrogen fluoride. It is irrelevant whether the raw materials are added individually or in suspension or whether two or more of these raw materials are introduced into the process as previously semi-processed physical or chemical multi-component mixing phases. Moreover, the dispersion aids such as ammonium fluoride, other alkaline solutions and acids, such as for instance sulphuric acid or phosphoric acid, can be added. As these chemicals are also available in standardised, analytically pure form, it is possible to produce highly refined optical glasses with the aid of the method in accordance with the invention, with the degree of purity of the glasses being subject to the impurities in the additional glass components.

The production of a glass in accordance with the invention described here encompasses the production of a greenbody from the base materials including $SiO_2$, powder or $SiO_2$ suspension and the additives, such as for instance dispersion aids, and from sintering or melting the glass from these greenbodies.

The greenbodies are produced by means of dispersion and dissolution of the base materials in any sequence in water, or optionally also in an alcoholic solvent.

In order to attain coloured glass, the MX doping substance, such as for instance CdS, CdSe, CdTe, but also mixed crystals such as CdS/CdSe, is dispersed or dissolved together with the base materials. Instead of using CdS, CdSe or CdTe it is also possible to employ in-situ production of doping substances from the elements, such as Cd+Te→+ CdTe, or from other materials, for instance CdO, $Na_2SeO_3$ and reduction gases. Other dyes such as for instance copper indium diselenide ($CuInSe^2$) or transition metals such as for instance CoO are also possible.

Dissolving and dispersing the base materials and any dopants that may be used for producing a greenbody is undertaken advantageously in such a way that this results in a suspension that can be poured or spread. In a preferred embodiment the suspension is poured into a mould. After the suspension has hardened at room temperature or at temperatures below 100° C. the greenbody is dried at room temperature or at temperatures not exceeding 400° C. The dried greenbody in then sintered or melted at temperatures between 600–1200° C., preferably between 700–1100° C., subject to the glass composition.

Optionally, the greenbodies can be ground or ground again, then dispersed and dried in order to improve the homogeneity and quality of the resultant glass.

The glasses can contain common purifiers in their customary quantities. Purifiers are deemed to be those components that release or vaporise gases within the temperature range determined by the method as a result of redox reactions. Preference is given to purifiers that in addition to having a purifying effect have a positive effect upon coloration as a consequence of the intervention in the redox process. Redox additives are for instance $As_2O_3$, $Sb_2O_3$, $As_2S_3$ and $Sb_2S_3$.

It has proven particularly advantageous for the schliere quality if the maximum proportion of F is 2 wt. %.

The invention is described in an exemplary manner with reference to the embodiments and the figures.

BRIEF DESCRIPTION OF THE DRAWING

FIG. 1 shows the transmission characteristic of a coloured glass manufactured in accordance with the invention with 0.234 wt. % CdSe+0.200 CdS (embodiment 3.3) and 0.234 CdSe+0.208 CdS (embodiment 3.6).

Firstly, the manufacture of a greenbody for a coloured glass in accordance with the invention shall be described with reference to embodiments, where CdS is employed as the MX doping substance.

In the embodiments given here the base materials are KOH, $H_3BO_3$, ZnO, $KHF_2$ and $SiO_2$ and the doping substance is US or another dye.

The base materials KOH, $H_3BO_3$, ZnO, $KHF_2$, CdS or other dyes and $SiO_2$ are dissolved or dispersed in the appropriate sequence in water while being stirred. Optionally, the raw materials can be stirred in with the aid of ultrasound or also by adding additives to the suspension in order to facilitate the dispersion and dissolution of the various raw materials.

The finished suspension is then poured into a mould in which it hardens and then air-dried at up to 100° C. for 1 to 96 hours. After removal from the mould the greenbody is dried for a further 1 to 96 hours at room temperature and finally for 1 to 48 hours at 40–400° C.

Fluid phase sintering to form transparent glass takes place at temperatures between 600–1200° C., subject to the composition of the glass. The subsequent tempering process for forming CdS crystallites is carried out at 400–700° C., with soak times being possible that range from 5 to 170 hours.

Glasses can be manufactured in accordance with the invention using the two-stage method utilising a fluid phase sintering process at temperatures that are approximately 200 to 700° C. below the manufacturing temperature of glasses when employing a pure melting method. This means that less energy is used during the manufacturing process, there is a substantially reduced emission of the toxic doping materials CdS, CdSe and CdTe, there is less chemical corrosion of the melt aggregate as would otherwise result from the aggressive nature of the glass composition, and less of the toxic doping material is used. As a result of it being possible to sinter the greenbody during the course of the two-phase method in accordance with the invention, it is also possible to shape the glass product at room temperature at an earlier point in time, substantially reducing the losses associated with processing, e.g. during sawing, grinding and polishing. This method is also extremely environmentally friendly as it is possible to use standard chemicals found within the chemical and glass-manufacturing industries for producing greenbodies and the production process is water-based.

Table 1 shows the final composition of various glasses that have been produced using the process in accordance with the invention, as well as the sintering temperature.

Table 1:

Composition and sintering temperature of coloured glasses with CdS doping manufactured in accordance with the invention.

The matching refining temperature is given in Table 2 under the corresponding example number. The minimal discrepancy in dye content does not result in any noteworthy changes. The total of the base glass is 100%, with the CdS dye being added to this.

| Example | Components | 1.1 | 1.2 | 1.3 | 1.4 | 1.5 | 1.6 |
|---|---|---|---|---|---|---|---|
| Composition | $SiO_2$ in % | 65.25 | 56.39 | 41.23 | 38.35 | 40.34 | 41.21 |
| | $K_2O$ in % | 16.36 | 16.96 | 25.19 | 27.27 | 23.50 | 25.43 |
| | $B_2O_3$ in % | 7.31 | 15.18 | 15.39 | 14.32 | 11.79 | 9.81 |
| | ZnO in % | 10.87 | 11.28 | 11.45 | 10.65 | 15.78 | 16.48 |
| | F in % | 0.21 | 0.22 | 6.73 | 9.40 | 8.59 | 7.08 |
| | CdS in % | 0.73 | 0.71 | 0.50 | 0.49 | 0.49 | 0.52 |
| Sinter temp. | | 900° C. | 850° C. | 700° C. | 650° C. | 650° C. | 700° C. |

Table 2 shows the same glasses as in Table 1, with the difference being that in Table 2 the doping agent is CdSe. The same glasses have the same numbers. It is to be noted that the quantity of dopant is dependent upon the doping agent itself.

In order to improve the quality of the glass, especially with respect to the minimisation of the number of bubbles, it can be advantageous if the glasses from Table 1 are not only heated to their sintering temperature, but that the temperature is raised slightly higher. This reduces the viscosity of the glasses and any bubbles that may have formed can escape from the vitreous body. Table 2 indicates the temperature for each embodiment at which the bubbles remaining in the glass escape from the glass. This temperature, which is that at which the bubbles escape, is termed the "refining temperature" in the current patent application.

As the temperature values clearly indicate, the "refining temperature", as defined in this application for the glasses produced in accordance with the invention, is always below the manufacturing and processing temperature of glasses manufactured by means of standard methods.

Table 2:

Coloured glasses with sharp cut characteristic curves comparable to those in Table 1, but displaced to higher wavelengths with the same composition, CdSe doping and refining temperature.

The corresponding refining temperature is given in Table 1 under the same example number. The minimal discrepancy in the dye content does not effect any noteworthy changes. The total of the base glass is 100%, with the CdS dye being added to this.

Although the embodiments 1.1 to 2.6 in Tables 1 and 2 are shown as doped, coloured glasses, the same glasses can also be manufactured with a mixed CdS/CdSe dopant instead of with a CdS or CdSe dopant.

Other colouring dopants are also possible, such as CoO, as is customary within the glass industry.

The detailed manufacturing procedure for a greenbody to be sintered shall now be described for the embodiment 1.6 in an exemplary manner for all other embodiments.

The greenbody for embodiment 1.6 is produced by means of a suspension containing the following substances in 90 litres of water and contains:

| Oxide | wt. % | Raw material | Original weight (KG) |
|---|---|---|---|
| $SiO_2$ | 41.21 | $SiO_2$ | 41.21 |
| $K_2O$ | 25.43 | KOH | 22.67 |
| $B_2O_3$ | 9.81 | $H_3BO_3$ | 17.51 |
| ZnO | 16.48 | ZnO | 16.48 |
| F | 7.08 | $KHF_2$ | 14.42 |
| CdS | 0.52 | CdS | 0.52 |

The various raw materials $SiO_2$, KOH, $H_3BO_3$, ZnO, $KHF_2$, CdS are dissolved or dispersed in the appropriate sequence in water while being stirred, creating a spreadable suspension that contains all the components of the subsequent transparent coloured optical glass.

The final suspension is then poured into any mould in which it hardens and then air-dried for 24 hours. After removal from the mould the greenbody is dried for a further 48 hours at room temperature and finally for 24 hours at 120° C.

Manufacture by means of fluid phase sintering or high viscosity melting occurs at 950° C. and with a soak time of 1 hour. The subsequent tempering process for forming CdS crystallites is carried out at 500° C., with a soak time of 10 hours.

| Example | Components | 2.1 | 2.2 | 2.3 | 2.4 | 2.5 | 2.6 |
|---|---|---|---|---|---|---|---|
| Composition | $SiO_2$ in % | 65.25 | 56.39 | 41.23 | 38.35 | 40.21 | 41.21 |
| | $K_2O$ in % | 16.36 | 16.96 | 25.19 | 27.27 | 23.50 | 25.43 |
| | $B_2O_3$ in % | 7.31 | 15.16 | 15.39 | 14.32 | 11.79 | 9.81 |
| | ZnO in % | 10.87 | 11.28 | 11.45 | 10.65 | 15.78 | 16.48 |
| | F in % | 0.21 | 0.22 | 6.73 | 9.40 | 8.59 | 7.08 |
| | CdS in % | 0.59 | 0.57 | 0.39 | 0.36 | 0.38 | 0.39 |
| Sinter temp. | | 1200° C. | 1150° C. | 950° C. | 870° C. | 890° C. | 950° C. |

Table 3 which follows gives embodiments of coloured glasses with the addition of mixed dyes, i.e. CdS/CdSe doping. The total of the basic glass is once again 100%; with the dye CdS/CdSe being added. The corresponding refining temperature is indicated in Table 3 under the particular example number in each case.

TABLE 3

Glasses with CdS/CdSe doping

| Example | Components | 3.3 | 3.6 |
|---|---|---|---|
| Composition | $SiO_2$ in % | 41.23 | 41.21 |
| | $K_2O$ in % | 25.19 | 25.43 |
| | $B_2O_3$ in % | 15.39 | 9.81 |
| | ZnO in % | 11.45 | 16.48 |
| | F in % | 6.73 | 7.08 |
| | CdS in % | 0.200 | 0.208 |
| | CdSe in % | 0.234 | 0.234 |
| Sinter temp. | | 980° C. | 950° C. |

FIG. 1 shows the transmission behaviour of a fluid phase sintered or highly viscous melted coloured glass with 0.234 CdSe+0.200 CdS in accordance with embodiment 3.3 and embodiment 3.6 in Table 3 in a wavelength range from 500–700 mm. In Table 3 embodiment 3.3 has the reference number 1, while embodiment 3.6 has the reference number 2 in FIG. 1.

The method in accordance with the invention makes known for the first time a method which when compared to conventional manufacturing processes, whereby these glasses are melted from various raw materials, initially involves the production of a greenbody that is compressed to form transparent glass. This manufacturing process dispenses with the need to heat the glass raw materials to their melting temperature in the viscosity range <102 dPa. Consequently, the process temperatures can be reduced significantly. In comparison with conventional methods that require 1200–1400° C. to melt the glass, this method in accordance with the invention only utilises a temperature ranging from 600–1200° C. This is particularly interesting in the manufacture of coloured glasses which can be employed, for instance as sharp cut filters, as the MX dopant required for coloured glasses is toxic and highly volatile at high temperatures. Therefore, in comparison with conventional melting methods for manufacturing glasses of this type, in addition to using far less energy the method in accordance with the invention also has the advantage that the lower temperature and shorter resting period means that the melting and/or sintering temperature and the emission of the dopant is significantly reduced. It is also for this reason that the method in accordance with the invention is also superior to existing methods in terms of environmental aspects.

Moreover, the extremely aggressive glass melt is prevented from corroding the melt aggregate excessively, which would otherwise make the unit rapidly inoperable.

The invention claimed is:

1. Method for manufacturing optical glasses and coloured glasses comprising the following steps:
   providing starting materials comprising $SiO_2$ and optionally, additives for reducing a sintering or melting temperature of the glass, the starting materials not including silicon alkoxides;
   dissolving the starting materials in any sequence in a fluid medium to produce a solution as far as is possible and a suspension to the extent that the starting materials are dispersed in solution;
   producing a greenbody from the dissolved and dispersed starting materials;
   drying the greenbody; and
   fluid-phase sintering the dried greenbody at temperatures below 1200° C., in particular in the temperature range from 600° C. to 1200° C.

2. Method in accordance with claim 1, wherein the $SiO_2$ powder is a nanoscale $SiO_2$ powder.

3. Method in accordance with claim 1 wherein the greenbody is held in a mould by means of pouring, spreading or extruding the suspension.

4. Method in accordance with claim 3 wherein the suspension poured, spread or extruded into the mould prior to drying the greenbody is solidified at temperatures below 100° C., in particular at room temperature.

5. Method in accordance with claim 1 wherein the greenbody is dried at temperatures lower than 400° C.

6. Method in accordance with claim 3, wherein the greenbody is removed from the mould to dry the greenbody.

7. Method in accordance with claim 1 wherein the dried greenbody is ground and then redispersed in a medium, dried, and then sintered in accordance with the sintering step of claim 1.

8. Method in accordance with claim 7 wherein the dried greenbody is ground again and then dispersed in a medium, dried, and then sintered in accordance with the sintering step of claim 1.

9. Method in accordance with claim 1 wherein the $SiO_2$ powder has a primary particle size of between 8 nm and 800 nm.

10. Method in accordance with claim 9 wherein the particle size of the SiO2 powder is between 20 nm and 100 nm.

11. Method in accordance with claim 1 wherein dispersion aids are added to the starting materials.

12. Method in accordance with claim 1 wherein the suspension also comprises dopants in order to produce coloured glasses.

13. Method in accordance with claim 1 wherein the fluid medium is water.

14. Method in accordance with claim 1 wherein the fluid medium is an alcohol, or a mixture of water and alcohol.

15. Method in accordance with claim 1 wherein the additives for reducing the sintering and/or the melting temperature of the glasses includes one or more of the following elements:
   Potassium, Sodium, Fluoride or also other elements with network modifying properties, in particular all $R^2{}_1O$ and $R^2O$ compounds, whereby $R^1$ signifies all elements in a first main group and $R^2$ all elements in a second main group, whereby these elements can be included as carbonate compounds, as soluble salts, as acids or alkaline solutions, as potassium carbonate, potassium solution and potassium fluoride or also potassium hydrogen fluoride and the additives for modifying the glass properties, which in comparison with quartz glass, in particular include the oxides of boron and zinc, whereby these substances can also be added by means of soluble components, in particular as boric acid or also in colloidal, oxide form, in particular as colloidal zinc oxide.

16. Method in accordance with claim 1 further comprising at least one dispersion agent selected from the group consisting of ammonium fluoride, alkaline solutions or acids, sulphuric acid, and phosphoric acid.

17. Method in accordance with claim 1 wherein the starting materials encompass:

$SiO_2$, KOH, $H_3BO_3$, ZnO, $KHF_2$, KF, $K_2CO_3$, $B_2O_3$ or compounds of several of these substances.

18. Method in accordance with claim 12 wherein the dopants include MX semiconductor dopants, wherein M stands for the element Cd or Cd and Zn and X for the element S, Se or Te.

19. Method in accordance with claim 18 wherein the dopants include CdTe, CdS, CdSe and mixed crystals of CdS/CdSe.

* * * * *

UNITED STATES PATENT AND TRADEMARK OFFICE
CERTIFICATE OF CORRECTION

PATENT NO. : 7,140,202 B2 Page 1 of 1
APPLICATION NO. : 10/224065
DATED : November 28, 2006
INVENTOR(S) : Jochen Freund et al.

It is certified that error appears in the above-identified patent and that said Letters Patent is hereby corrected as shown below:

On The Title Page: Item (57)
ABSTRACT:

Line 2, delete "SiO.sub.2" and insert --$SiO_2$--

Claim 15, Column 8, Line 50, delete "$R^2{}_1O$" and insert --$R^1{}_2O$--

Signed and Sealed this

Third Day of April, 2007

JON W. DUDAS
*Director of the United States Patent and Trademark Office*